(12) United States Patent
Jung et al.

(10) Patent No.: US 7,066,521 B2
(45) Date of Patent: Jun. 27, 2006

(54) LOCKING GUIDE OF SEAT LOCKING DEVICE FOR VEHICLE

(75) Inventors: Jae-Chul Jung, Ulsan-Shi (KR); Masao Nihei, Gyungju-Shi (KR)

(73) Assignee: DAS Co., Ltd., Kyungju-Shi (KR)

( * ) Notice: Subject to any disclaimer, the term of this patent is extended or adjusted under 35 U.S.C. 154(b) by 61 days.

(21) Appl. No.: 11/002,630

(22) Filed: Dec. 3, 2004

(65) Prior Publication Data
US 2005/0184550 A1    Aug. 25, 2005

(30) Foreign Application Priority Data
Feb. 23, 2004    (KR)    ...................... 20-2004-0004657

(51) Int. Cl.
*B60N 2/02*    (2006.01)
(52) U.S. Cl. ................... 296/65.13; 248/430
(58) Field of Classification Search ............. 296/65.13, 296/65.14; 248/429, 430
See application file for complete search history.

(56) References Cited

U.S. PATENT DOCUMENTS

| | | | | |
|---|---|---|---|---|
| 4,881,774 A * | 11/1989 | Bradley et al. | ............. | 248/430 |
| 5,100,092 A * | 3/1992 | Sovis | ......................... | 248/429 |
| 5,350,148 A * | 9/1994 | Yamamura | ................. | 248/430 |
| 5,676,341 A * | 10/1997 | Tarusawa et al. | ........ | 296/65.13 |
| 5,897,091 A * | 4/1999 | Hayakawa et al. | ......... | 248/430 |
| 6,098,946 A * | 8/2000 | Sechet et al. | ................ | 248/430 |
| 6,176,460 B1 * | 1/2001 | Kojima et al. | .............. | 248/429 |
| 6,257,541 B1 * | 7/2001 | Timon et al. | ............... | 248/429 |
| 6,322,036 B1 * | 11/2001 | Tame | ......................... | 248/429 |
| 6,520,474 B1 * | 2/2003 | Yoshida et al. | ............. | 248/430 |
| 6,619,741 B1 * | 9/2003 | Tame | ......................... | 297/341 |
| 6,869,057 B1 * | 3/2005 | Matsumoto et al. | ........ | 248/430 |
| 6,981,681 B1 * | 1/2006 | Matsumoto | ................. | 248/429 |

* cited by examiner

*Primary Examiner*—Kiran B. Patel
(74) *Attorney, Agent, or Firm*—Mayer, Brown, Rowe & Maw, LLP

(57) ABSTRACT

Disclosed herein is a locking guide of a locking device for a vehicle seat. The locking device comprises a lower rail, an upper rail coupled to the lower rail, a locking guide fixed to a bottom surface of the upper rail, a pair of lock members having a plurality of locking protrusions, a plurality of locking grooves engaged with the locking protrusions, and a lock spring. The locking guide is formed by pressing a plate member having a predetermined thickness. The locking guide comprises a bottom surface recessed in the locking guide, a guide body having a circumferential portion formed along edges of the bottom surface, guide holes formed through the bottom surface of the guide body such that the locking protrusions can enter or exit through the guide holes, supporting posts extended at the front and rear sides of the guide body to a height such that the supporting posts can be connected to the upper rail, and fixing flanges, each of which has a fixing hole and is bent at an end of the supporting post so as to be fixed to the upper rail.

2 Claims, 6 Drawing Sheets

LOCKING GUIDE OF SEAT LOCKING DEVICE FOR VEHICLE

BACKGROUND OF THE INVENTION

1. Field of the Invention

The present invention relates to a locking guide of a locking device for a vehicle seat, and more particularly, to a locking guide of a locking device on a seat rail for a vehicle seat, designed to maintain a position of the vehicle seat on the seat rail.

2. Description of the Related Art

Vehicle seats serve to maintain the posture of a passenger in a vehicle, and are fixed at an upper portion of a seat rail, which allows the vehicle seat to slide linearly thereon, so that the passenger can maintain a comfortable posture on the seat.

Referring to FIG. 1, a seat rail 30 generally includes a lower rail 31 fixed to a vehicle body, and an upper rail 32 coupled to the lower rail 31 and having a seat for a passenger fixed thereon.

The seat rail 30 is provided with a locking guide 35, which is fixed to the bottom surface of the upper rail 32 and has guide holes 33 formed through the bottom surface of the lock guide 35 so as to allow one or more lock members 38 to enter or exit therethrough. The seat rail 30 further includes the lock members 38 disposed between the upper rail 32 and the locking guide 35. Each of the lock members 38 is connected at an upper portion to an operating lever, and has a plurality of locking protrusions 36 and 37 formed at a lower portion thereof, such that the lock member 38 can be lifted and lowered inside the locking guide 35.

The lower rail 31 has locking grooves 39 and 40 uniformly spaced in the longitudinal direction at the center of the lower rail 31, such that the locking protrusions 36 and 37 can be engaged with the locking grooves 39 and 40. Additionally, the seat rail is installed with a lock spring 41, which constantly presses the lock members 38 so as to force the locking protrusions 36 and 37 to be engaged with the locking grooves 39 and 40, thereby completing a locking device 45.

In the seat rail including the locking device constructed as described above, a locking guide plays an important role in smooth activation of the lock member on the seat rail, and FIG. 6 shows a conventional locking guide 1.

Referring to FIG. 6, the locking guide 1 has fixing flanges 3, each having a fixing hole 2, which are integrally formed to both sides of an upper portion of the locking guide 5 and fixed to the upper rail connected with the lower rail LR and fixing pin FP, and lock holes 5 integrally formed through the locking guide 5 such that the lock members can enter the lock holes 5. The locking guide 5 is generally formed by sintering or die-casting method.

As such, since the conventional locking guide is formed by sintering or die-casting, thereby increasing manufacturing costs, and has a drawback of being heavy, thereby contradicting the trend toward weight reduction of seat rails, and also increasing manufacturing costs of the seat rail.

SUMMARY OF THE INVENTION

The present invention has been made to solve the above problems, and it is an object of the present invention to provide a locking guide of a locking device in a seat rail, which is formed by pressing a plate member, thereby enabling easy manufacturing of the locking guide, and reduction in manufacturing costs and weight of the locking guide, leading to reduction in manufacturing costs and weight of the seat rail.

BRIEF DESCRIPTION OF THE DRAWINGS

The foregoing and other objects and features of the present invention will be more clearly understood from the following detailed description taken in conjunction with the accompanying drawings, in which.

DESCRIPTION OF THE PREFERRED EMBODIMENTS

Preferred embodiments will now be described in detail with reference to the accompanying drawings.

Figure 1:
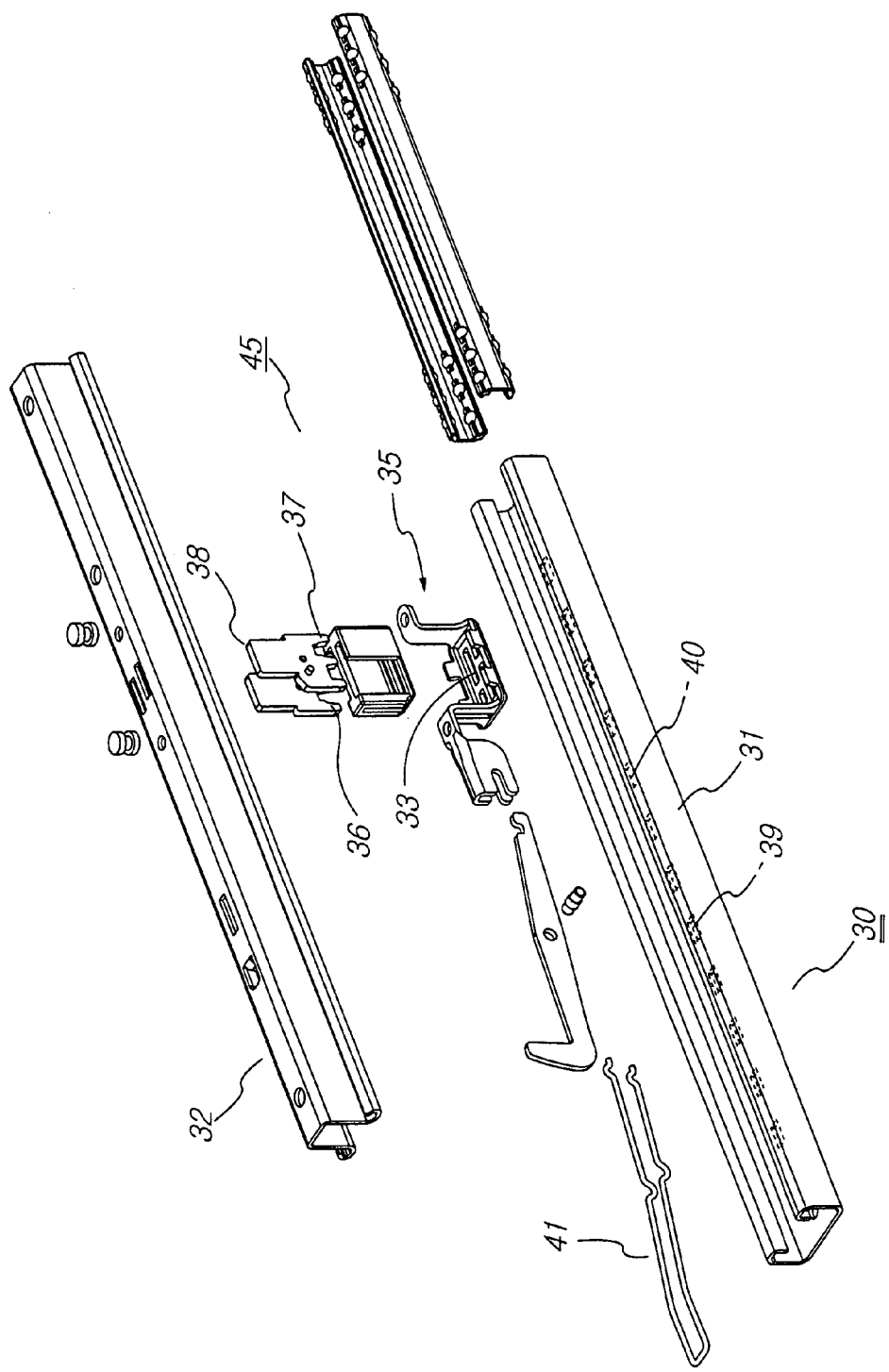
FIG. 1 is an exploded perspective view illustrating a locking device of a sear rail for a vehicle with a locking guide in accordance with the present invention.
Figure 2:
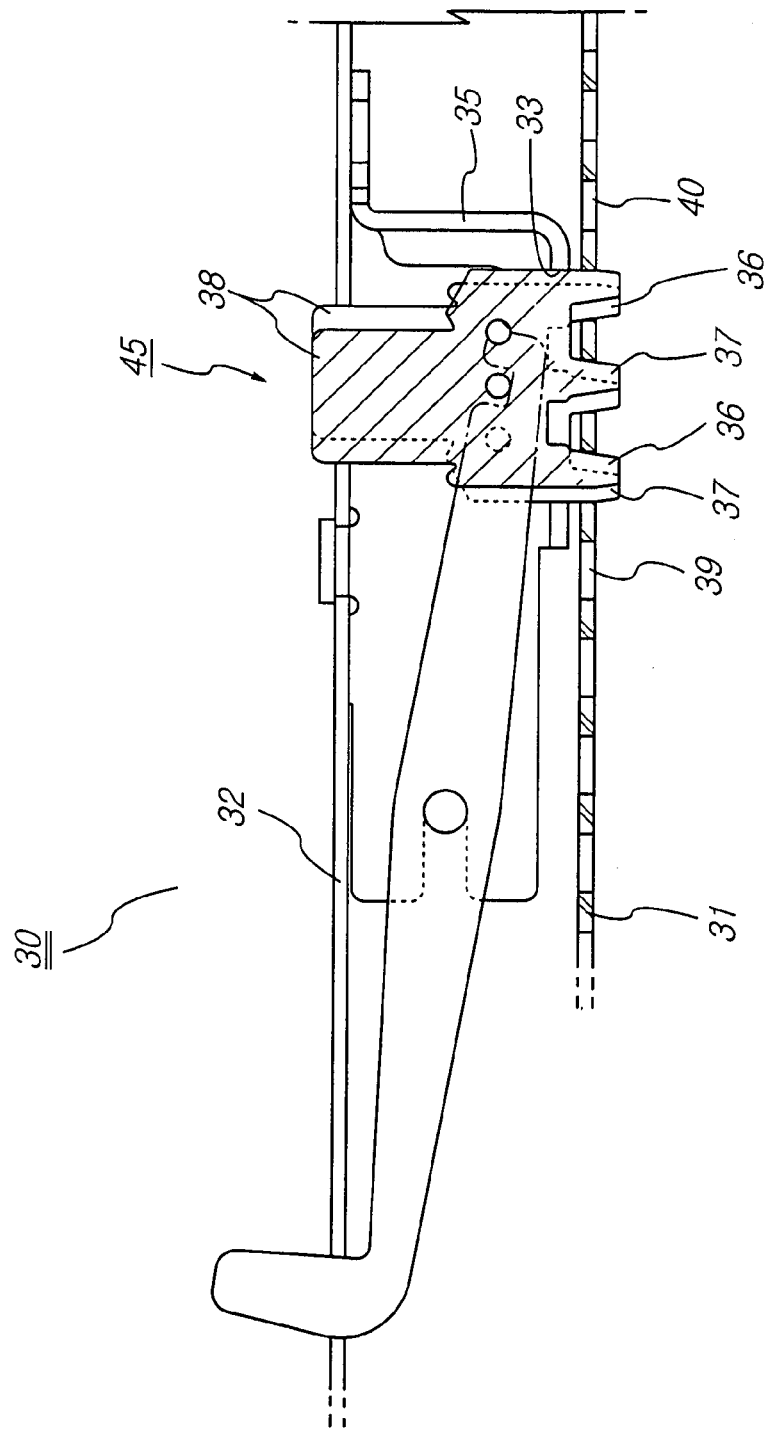
FIG. 2 is a partial cross sectional view illustrating the set locking guide of the locking device in accordance with the present invention.
Figure 3:
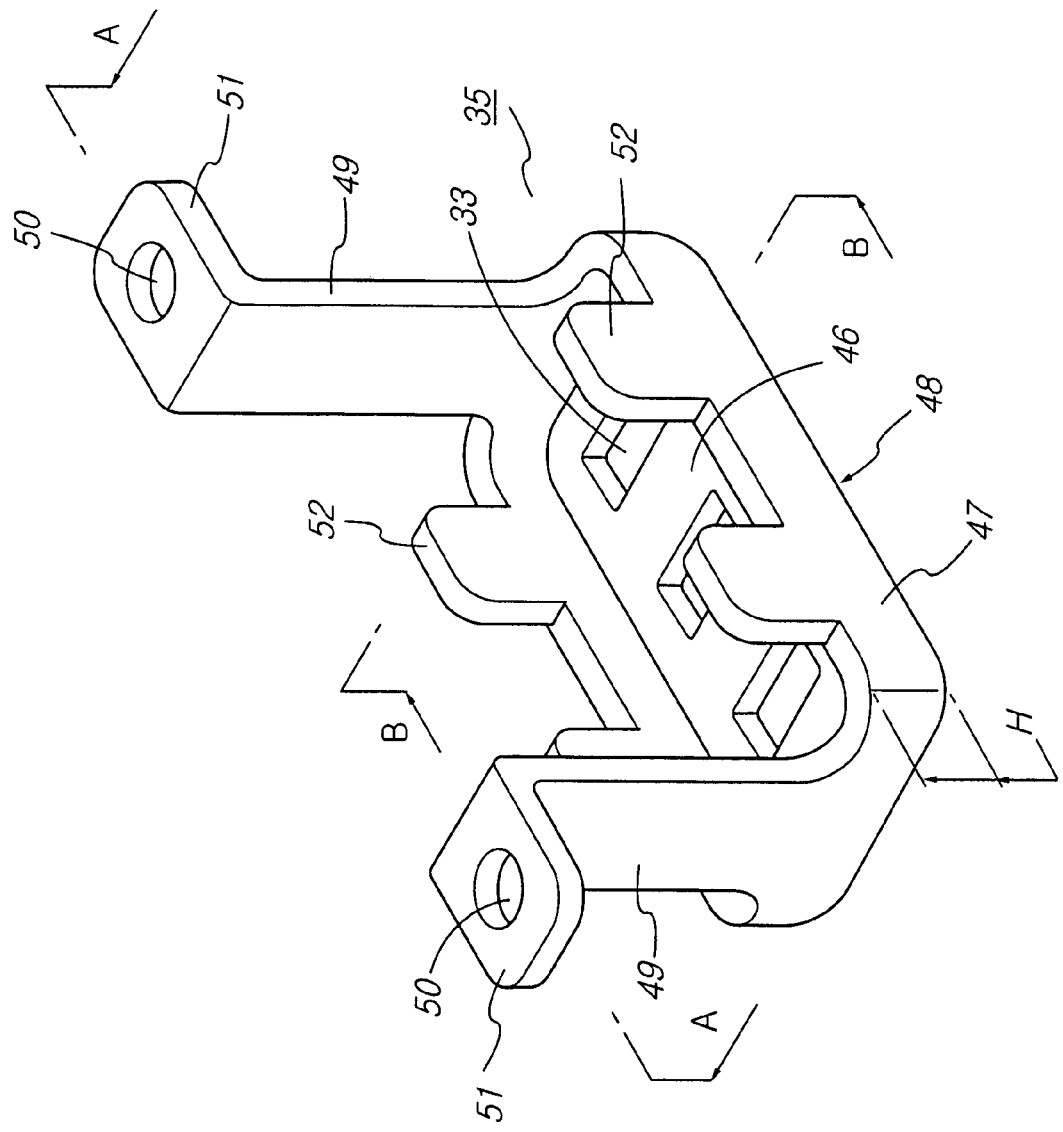
FIG. 3 is a perspective view illustrating the locking guide of the locking device in accordance with the present invention.
Figure 4:
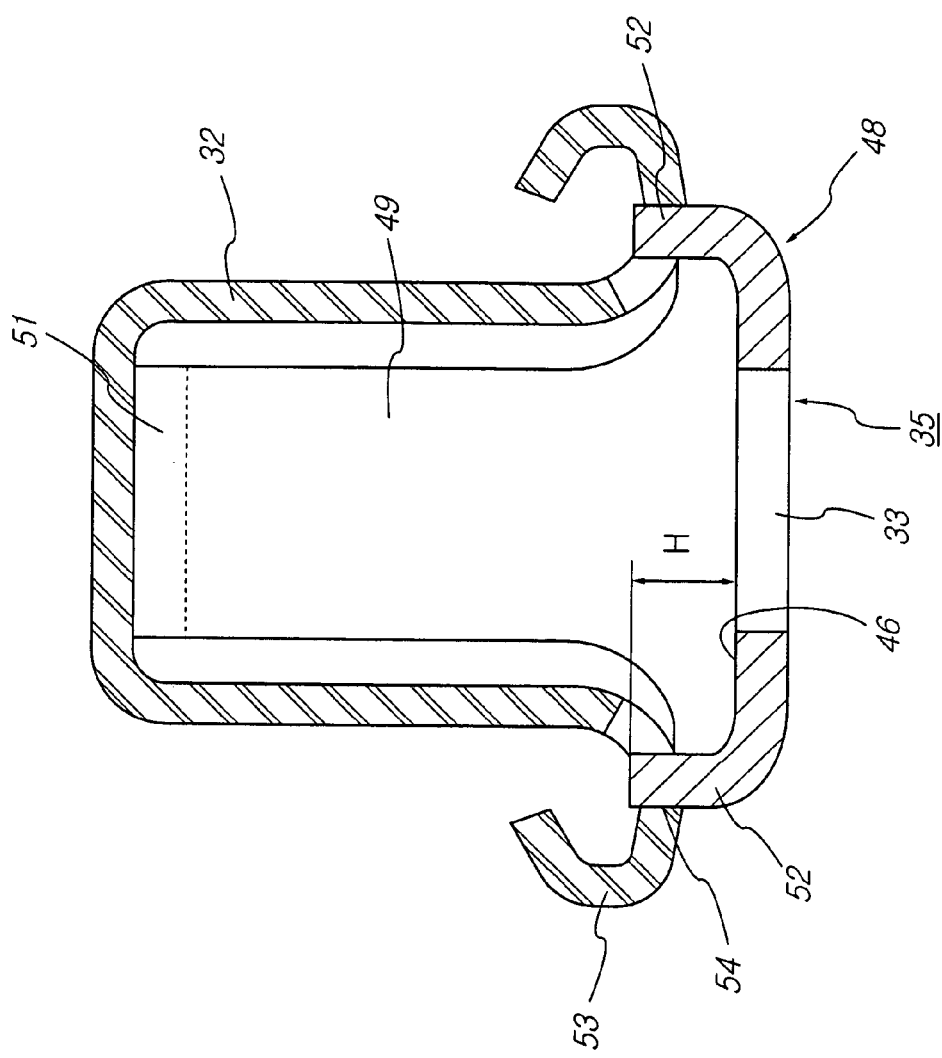
FIG. 4 is a cross-sectional view illustrating the locking guide taken along the line A—A of FIG. 3.
Figure 5:
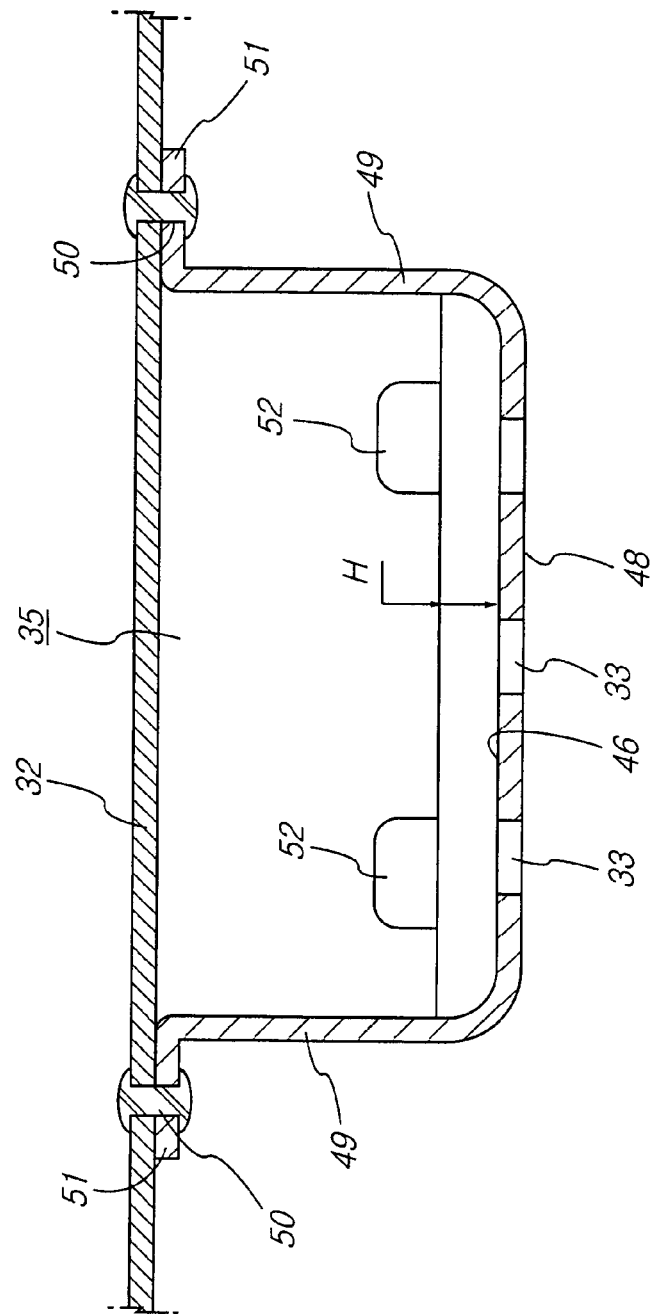
FIG. 5 is a cross-sectional view illustrating the locking guide taken along the line B—B of FIG. 3.
Figure 6:
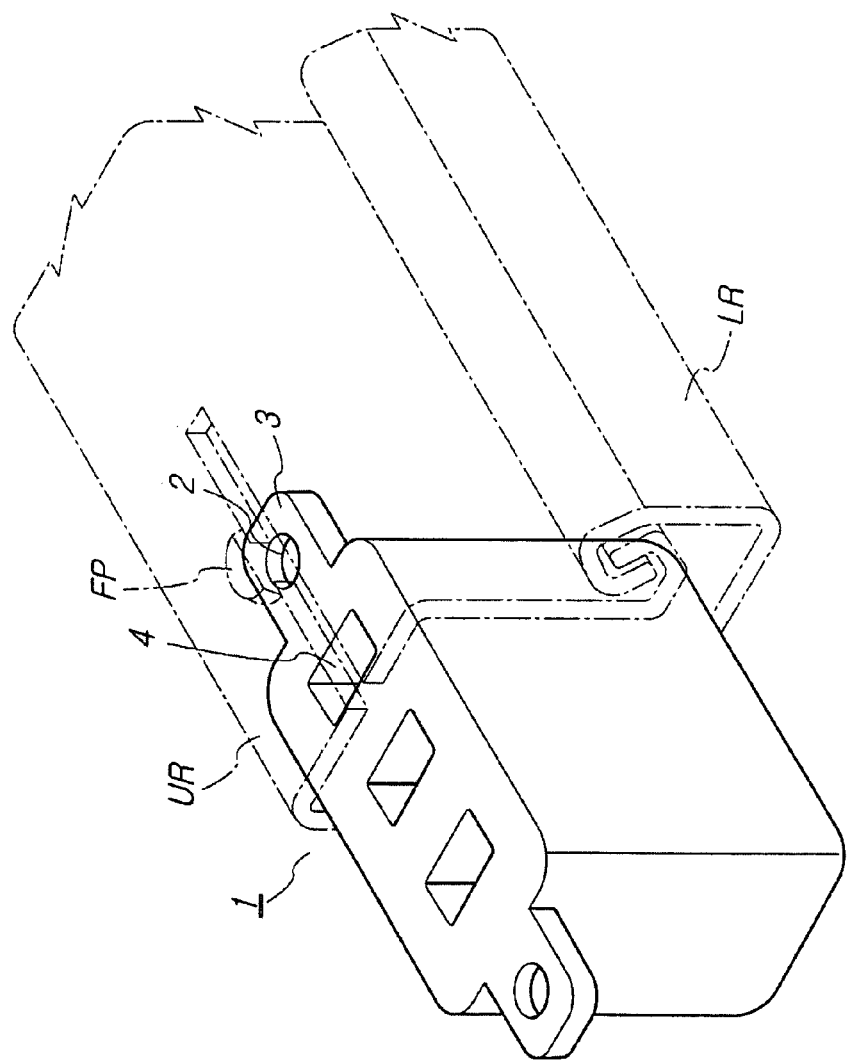
FIG. 6 is a perspective view illustrating a conventional locking guide of a locking device of a seat rail for a vehicle.

FIG. 1 is an exploded perspective view illustrating a locking device for a vehicle seat with a locking guide in accordance with the present invention, FIG. 2 is a partial cross sectional view illustrating the set locking guide of the locking device in accordance with the present invention, FIG. 3 is a perspective view illustrating the locking guide of the locking device in accordance with the invention, FIG. 4 is a cross-sectional view illustrating the locking guide taken along the line A—A of FIG. 3, and FIG. 5 is a cross-sectional view illustrating the locking guide taken along the line B—B of FIG. 3.

Typically, a seat rail 30 for a vehicle includes a lower rail 31 fixed to a vehicle body, and an upper rail 32 coupled to the lower rail 31 and having a seat for a passenger fixed on the upper rail 32.

The seat rail 30 is provided with a locking guide 35, which is fixed to the bottom surface of the upper rail 32 and has guide holes 33 formed through the bottom surface of the lock guide to allow lock members to enter or exit therethrough, and with one or more lock members 38 provided inside the locking guide 35 so as to be lifted and lowered inside the locking guide 35. For this purpose, each of the lock members 38 is connected at an upper portion thereof to an operating lever, and formed at a lower portion thereof with a plurality of locking protrusions 36 and 37.

The lower rail 31 has locking grooves 39 and 40 uniformly spaced in the longitudinal direction at the center of the bottom surface of the lower rail 31, such that the locking protrusions 36 and 37 can be engaged with the locking grooves 39 and 40, and the lock member 38 is provided with additional components, including a lock spring 41 constantly pressing the lock member 38 so as to engage the locking protrusion 36 and 37 with the locking grooves 39 and 40, thereby completing a locking device 45.

The present invention is characterized in that the locking guide 35 playing an important role in smooth activation of the lock members on the seat rail 30 including the locking device 45 has enhanced construction.

For this purpose, according to the present invention, the locking guide 35 is formed by pressing a plate member having a predetermined thickness to have a guide body 48, which comprises a bottom surface 46 recessed in the locking guide 35, and a circumferential portion 47 formed along edges of the bottom surface 46 and having a predetermined height H.

The guide body 48 has the guide holes 33 formed through the bottom surface 46 such that the locking protrusions 36 and 37 can enter or exit through the guide holes 33, and supporting posts 49 extended at the front and rear sides of the guide body 48 to a height such that the supporting posts 49 can be connected to the lower surface of the upper rail 32.

Each of the supporting posts 49 has a fixing flange 51, which has a fixing hole 50, and is bent at the end of the supporting post 49 so as to be fixed to the upper rail 32.

The guide body 48 has movement prevention protrusions 52 uniformly spaced in the longitudinal direction along each edge of the guide body 48, and coupled to holes 54 formed along an associated bent portion 53 of the upper rail 32, in order that the locking guide 35 is maintained in a firmly assembled state, and is prevented from being moved on the seat rail.

As such, the present invention has an advantage in that the locking guide 35 for guiding the lock members 38 is formed by pressing the plate member having a predetermined thickness (which is the same as that of the lower and upper rails 31 and 32 constituting the seat rail 30), thereby reducing the weight of the locking guide, leading to weight reduction of the seat rail.

Moreover, the present invention has an advantage in that the locking guide 35 is simply formed in a single process by pressing the plate member, thereby simplifying a manufacturing process of the locking guide, and reducing manufacturing costs of the locking guide, leading to an overall reduction in manufacturing costs.

Additionally, the movement prevention protrusions 52 are formed in the longitudinal direction along both edges of the guide body 48, and coupled to the holes 54 formed along the associated bent portions 53 formed at both sides of a lower portion of the upper rail 32, thereby preventing the locking guide 35 from being moved on the seat rail, and allowing the locking guide 35 to be maintained in a firmly assembled state.

As apparent from the above description, according to the present invention, there are advantageous effects in that the locking guide is formed by pressing the plate member, thereby reducing the manufacturing costs and the weight of the locking guide while allowing easy manufacturing thereof, leading to reduction in manufacturing costs and weight of the seat rail.

It should be understood that the embodiments and the accompanying drawings as described above have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A locking guide of a locking device in a vehicle seat, the locking device comprising:

a lower rail fixed to a vehicle body;

an upper rail coupled to the lower rail and having a seat for a passenger fixed on the upper rail;

the locking guide fixed to a bottom surface of the upper rail;

one or more lock members provided inside the locking guide, such that each of the lock members is connected at an upper portion thereof to an operating lever and has a plurality of locking protrusions formed at a lower portion thereof, so as to be lifted and lowered inside the locking guide;

a plurality of locking grooves spaced in a longitudinal direction at a center of the lower rail so as to be engaged with the locking protrusions; and a lock spring provided inside the locking guide to constantly press the lock members such that the locking protrusions are engaged with the locking grooves of the lower rail, wherein the locking guide is formed by pressing a plate member having a predetermined thickness, the locking guide comprising:

a bottom surface recessed in the locking guide;

a guide body having a circumferential portion formed along edges of the bottom surface and having a predetermined height;

guide holes formed through the bottom surface of the guide body such that the locking protrusions of the lock members can enter or exit through the guide holes;

supporting posts extended at the front and rear sides of the guide body to a height such that the supporting posts can be connected to the lower surface of the upper rail; and fixing flanges, each of which has a fixing hole and is bent at an end of the supporting post so as to be fixed to the upper rail.

2. The locking guide as set forth in claim 1, wherein the guide body has movement prevention protrusions formed in the longitudinal direction along both edges of the guide body, and coupled to holes formed along associated bent portions of the upper rail so as to maintain a firmly assembled state of the locking guide.

\* \* \* \* \*